July 21, 1959 W. K. M. KLEINE 2,895,355
DRILL SHANK FOR DRILLS
Filed March 4, 1954
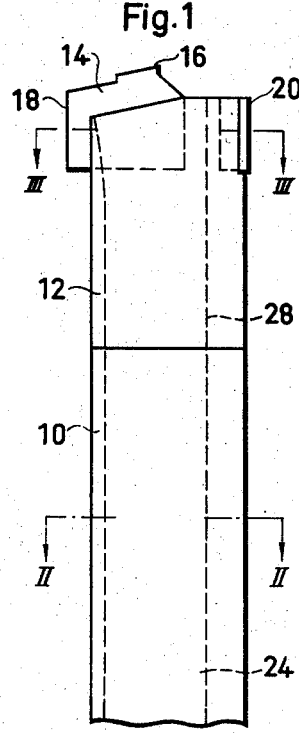
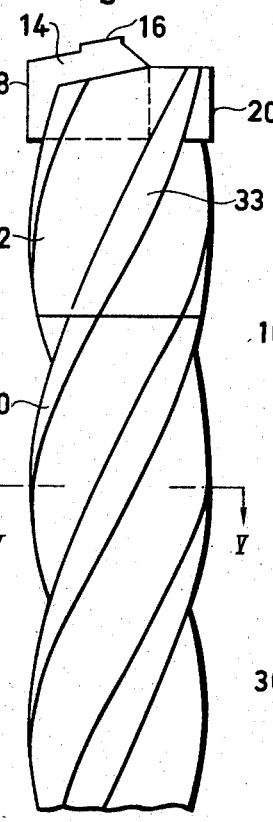
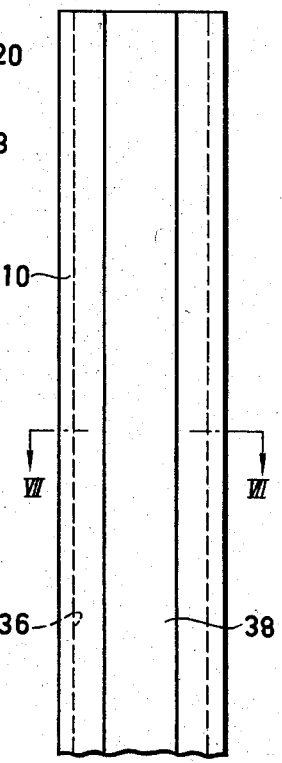
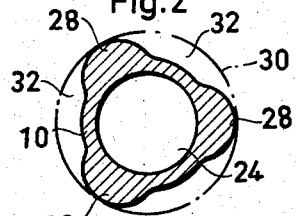
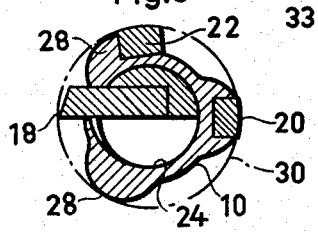
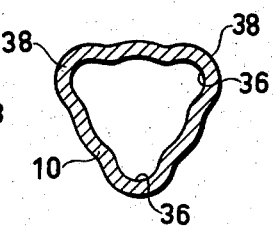
Inventor:
Werner Kurt Max Kleine
By James C. Markle
His Attorney United States Patent Office 2,895,355
Patented July 21, 1959

2,895,355

DRILL SHANK FOR DRILLS

Werner Kurt Max Kleine, Bremen-Mahndorf, Germany, assignor to Maskinfirma R. L. Carlstedt, Hagersten, Sweden, a corporation of Sweden Application March 4, 1954, Serial No. 414,117

Claims priority, application Sweden March 4, 1953

10 Claims. (Cl. 77—68)

My invention relates to drill shanks for drills of the type having an inner bore or channel to lead off a cooling liquid out of the bore-hole being produced in a work-piece, together with the chips formed by the cutting tool of the drill. In drills of said type, which are also called rifle drills, the cooling liquid is supplied to the cutting tool through a space between the wall of the bore-hole and the drill shank to remove the chips through the interior of said shank.

A primary object of my invention is to provide an improved drill shank of the type under consideration adapted to be used with particular advantage in the drilling of long holes and especially in connection with small diameters of the drill where the depth of the hole is very great relative to the diameter thereof.

A further object of my invention is to provide a drill shank having means adapted to increase the life of the drill by counteracting oscillations of the drill and by increasing the feeding speed at which the drill is advanced through the work-piece.

A further object of my invention is to provide a drill shank having a substantially improved resistance to breaking strains.

A further object of my invention is to provide a drill shank having an increased torsional strength, allowing increase of the torque and, consequently the feeding speed.

A still further object of my invention is to provide a drill shank having means assisting in a damping of any torsional oscillations that may occur.

Still another object of my invention is to provide a drill shank formed so as to reduce the resistance to the flow of the cooling medium due to the feature that the space between the drill and the wall of the hole provides a technically more favorable configuration than hitherto with regard to the flow of the medium, which may be caused to apply to the drill shank a torque acting in a direction opposed to the torque applied to the cutting tool by the work-piece.

Further objects and advantages of my invention will be apparent from the following description, considered in connection wtih the accompanying drawing which forms part of this specification, and of which:

Fig. 1 is an elevational view of a drill with a drill shank made in accordance with one embodiment of my invention.

Fig. 2 and 3 are sectional views taken on lines II—II and III—III of Fig. 1, respectively.

Fig. 4 is an elevational view of a drill with a drill shank made according to a second embodiment of my invention.

Fig. 5 is a sectional view taken on line V—V of Fig. 4.

Fig. 6 is an elevational view of a drill shank constructed according to a third embodiment of my invention.

Fig. 7 is a sectional view taken on line VII—VII of Fig. 6.

Referring to the drawing the drill may be composed of a drill shank or a drill rod 10 and a drill head 12, which parts may be releasably connected with one another by means of threads or like means. The drill head 12 carries at its free end a cutting tool 14, which may be of any known construction and is made from a metal harder than that of the drill head and the drill shank. The cutting tool 14 is provided with cutting edges 16 and 18 located to one side of the center line or axis of rotation of the head. For the centering of the drill the drill head is provided in known manner with guiding shoulders, one guiding shoulder 20 being located substantially diametrically opposite the cutting edge 18, another guiding shoulder 22 preferably being disposed at an angle to the cutting edge smaller than 90°. The drill shank 10 and the drill head 12 have an internal longitudinal bore or channel 24, 26, the cooling liquid and drill chips cut off by the tool being conveyed through said bore or channel away from the bore-hole in the work-piece.

In the embodiment illustrated in Figs. 1–3, the hollow drill shank 10 and the drill head 12 are provided on their external surface with three ridges or elevations 28, while the cross-section of their internal surface has a circular configuration. The three ridges 28 are uniformly distributed over the circumference and extend axially to the generatrix of the shank. The edge 18 of the cutting tool 14 has a radial position such as to project outside the circle circumscribing the ridges, the diameter of said circle thus being somewhat smaller than that of the hole 30 to be bored in the work-piece, as is indicated in Figs. 2 and 3. As will be seen from these figures, the space between the drill shank and the wall 30 of the hole is divided into three clearances 32. Even if the combined area of said three clearances is substantially the same as that of the concentric clearance formed between the wall of the hole and the cylindrical configuration of the external surface of the drill shanks hitherto used, the three clearances produced by the form of the shank made according to my invention create more favorable conditions of flow for the cooling medium because the clearances become larger and thus offer less resistance. This is of particular importance in drills of the type particularly considered by my invention, since the high feeding speed calls for large quantities of cooling liquid per unit of time, which in turn requires a supply of the cooling medium under very high pressures such as 20 to 65 atmospheres above atmospheric. The ridges 28 may be formed so as to create wedge-shaped clearances between them and the wall 30 of the bore, into which clearances the cooling medium is pressed to generate supporting lubricating films of the cooling liquid according to the same principle on which frictional bearings or block frictional bearings operate. In this way it will thus be possible to reduce, or entirely to avoid, the metallic contact between the drill shank or bar and the wall 30 of the hole. The cooling liquid advanced in the clearances 32 at a high speed and due to its mass has a damping influence on torsional oscillations occurring in the drill shank, which contribute longer life of the drill.

The embodiment of my invention illustrated in Figs. 4 and 5 differs from the preceding one substantially by the ridges 33, which are four in number, extending at an angle to the generatrix of the shank by being wound helically around the circumference of the shank and the drill head. This construction makes it possible to impart a torque to the drill from the cooling liquid flowing at high velocity and under high pressure along the external surface of the drill, said torque counteracting the torque caused by the action of the cutting tool on the work-piece and thus in a corresponding degree reducing the net torque acting on the anchored end of the drill shank.

The interior surface of the hollow drill shank and the drill head may be made with depressions on a level with the ridges. In the embodiment of my invention shown in Figs. 6 and 7, ridges 38 and depressions 36 of the kind under consideration have been produced by imparting to an originally round pipe blank of uniform wall thickness the configuration embodying my invention. The depressions 36 may thus have a depth such as to impart the same wall thickness to the drill shank around its circumference.

The ridges may form separate members soldered or welded onto the external surface of a round pipe, for instance, so as to extend axially or helically as described above. In certain cases it is also possible to dispose the elevations in a spotted fashion on the external surface of the shank. The drill shank 10 may extend as far as to the cutting tool 14 to support the same, the separate drill head 12 being dispensed with.

While several more or less specific embodiments of my invention have been described, it is to be understood that this is for the purpose of illustration only, and that my invention is not to be limited thereby, but its scope is to be determined by the appended claims.

What I claim is:

1. Drill mechanism for deep hole boring comprising a hollow drill head and shank, said drill head having mounted therein a cutting tool having cutting edges for cutting a bore and extending from at least the central axis of the drill to a radius at least as great as the radius of said shank, the outer periphery of said head and said shank being non-circular and including a plurality of peripherally spaced projections extending along the length of the tool, for centering the same in the bore created by the drill, the spaces between said projections providing a plurality of flow passages for introduction of liquid under high pressure externally of the drill to the cutting end thereof, the central opening of said hollow drill head communicating laterally of said cutting tool to provide egress for the pressure fluid and the chips resulting from the boring action of the tool.

2. Drill mechanism as defined in claim 1 in which said cutting tool is formed by a separate piece of metal harder than and fixed in the drill head.

3. Drill mechanism as defined in claim 2 in which said cutting tool comprises a substantially radially extending blade extending from at least the longitudinal axis of the drill mechanism to a distance slightly greater than the diameter of the drill head and shank portions of the drill mechanism.

4. Drill mechanism as defined in claim 1 in which said projections are in the form of integral ridges extending axially of the longitudinal axis of the mechanism.

5. Drill mechanism as defined in claim 1 in which said projections are in the form of integral ridges extending helically along the length of at least the shank portion of the drill.

6. Drill mechanism as defined in claim 1 in which the wall of the drill head and shank portions of the mechanism is of thickner section at the places where said projections are located than at peripherally intermediate places.

7. Drill mechanism as defined in claim 1 in which the shank portion is formed of material of uniform wall section around the periphery.

8. Drill mechanism as defined in claim 1 in which said projections are substantially uniformly spaced peripherally of the shank and drill head portions to center the drill head mechanism in the bore.

9. Drill mechanism as defined in claim 1 in which inserts are provided in at least certain of said projections, said inserts being adapted to bear against the wall of the bore formed by the drill.

10. Drill mechanism as defined in claim 1 in which said projections are formed to create a wedge-shaped supporting film of high pressure liquid between the projections and the wall of the bore between which and the drill there is relative rotary movement.

References Cited in the file of this patent

UNITED STATES PATENTS

| 9,961 | Walbach | Aug. 23, 1853 |
| 291,568 | Borchardt | Jan. 8, 1884 |
| 1,829,659 | Kefflo | Oct. 27, 1931 |
| 2,182,263 | Probert | Dec. 5, 1939 |
| 2,708,852 | Wohlfahrt | May 24, 1955 |

FOREIGN PATENTS

| 15,631 | Great Britain | 1896 |